(12) United States Patent
Freund et al.

(10) Patent No.: US 8,817,189 B2
(45) Date of Patent: Aug. 26, 2014

(54) DIGITAL TELEVISION WITH IMPROVED INPUT SELECTION FUNCTIONALITY

(75) Inventors: Joseph M. Freund, Fogelsville, PA (US); Roger A. Fratti, Mohnton, PA (US)

(73) Assignee: LSI Corporation, San Jose, CA (US)

( * ) Notice: Subject to any disclaimer, the term of this patent is extended or adjusted under 35 U.S.C. 154(b) by 47 days.

(21) Appl. No.: 13/248,297

(22) Filed: Sep. 29, 2011

(65) Prior Publication Data
US 2013/0083243 A1 Apr. 4, 2013

(51) Int. Cl.
*H04N 5/445* (2011.01)
*H04N 5/50* (2006.01)
*H04N 5/268* (2006.01)
*H04N 5/44* (2011.01)

(52) U.S. Cl.
USPC .......... 348/565; 348/563; 348/569; 348/706; 348/734

(58) Field of Classification Search
USPC .................. 348/563–565, 569, 705–706, 734
See application file for complete search history.

(56) References Cited

U.S. PATENT DOCUMENTS

| | | | | |
|---|---|---|---|---|
| 5,760,698 A * | 6/1998 | Iijima et al. | .................. | 340/3.43 |
| 5,883,621 A * | 3/1999 | Iwamura | .......................... | 725/37 |
| 5,929,941 A * | 7/1999 | Tsuchiya et al. | ............. | 348/706 |
| 6,052,471 A | 4/2000 | Van Ryzin | ....................... | 381/85 |
| 6,122,018 A * | 9/2000 | Sugihara et al. | ............. | 348/705 |
| 6,333,739 B1 * | 12/2001 | Koyama et al. | ............... | 715/744 |
| 6,459,440 B1 * | 10/2002 | Monnes et al. | ............... | 715/808 |
| 6,473,797 B1 * | 10/2002 | Hirasawa | ....................... | 709/224 |
| 6,490,009 B1 * | 12/2002 | Asakura | ......................... | 348/705 |
| 6,587,154 B1 * | 7/2003 | Anderson et al. | ............. | 348/553 |
| 6,591,314 B1 * | 7/2003 | Colbath | ........................... | 710/36 |
| 6,603,488 B2 * | 8/2003 | Humpleman et al. | ........ | 715/771 |
| 6,825,858 B2 * | 11/2004 | Sato | ................................ | 715/735 |
| 7,178,157 B1 * | 2/2007 | Kimura et al. | .................. | 725/38 |
| 7,366,702 B2 * | 4/2008 | David | ............................. | 705/67 |
| 7,372,506 B2 * | 5/2008 | Cho | ................................ | 348/569 |
| 7,380,260 B1 * | 5/2008 | Billmaier et al. | ............... | 725/37 |
| 7,636,130 B2 * | 12/2009 | Chang | .......................... | 348/706 |
| 7,701,452 B2 * | 4/2010 | Fujiwara | ....................... | 345/204 |
| 7,728,911 B2 * | 6/2010 | Lacy et al. | ..................... | 348/706 |
| 7,825,993 B2 * | 11/2010 | Shen et al. | ..................... | 348/705 |
| 7,880,816 B2 * | 2/2011 | Kinoshita et al. | ............. | 348/705 |
| 7,934,246 B2 * | 4/2011 | Iwahashi | ....................... | 725/151 |
| 7,982,726 B2 * | 7/2011 | Kim et al. | ..................... | 345/204 |
| 7,990,370 B2 * | 8/2011 | Jeong | ............................. | 345/204 |
| 8,001,300 B2 * | 8/2011 | Menez et al. | ................... | 710/62 |
| 8,045,058 B2 * | 10/2011 | Jang | ............................... | 348/554 |
| 8,132,100 B2 * | 3/2012 | Seo et al. | ...................... | 715/706 |
| 8,291,343 B2 * | 10/2012 | Kobayashi | .................... | 715/810 |
| 8,346,989 B2 * | 1/2013 | Du et al. | ......................... | 710/15 |
| 2001/0015771 A1 * | 8/2001 | Kishimoto et al. | ........... | 348/705 |
| 2001/0035912 A1 | 11/2001 | Cooper et al. | ................ | 348/513 |
| 2001/0052946 A1 * | 12/2001 | Sato | .............................. | 348/706 |
| 2002/0167617 A1 * | 11/2002 | Vornsand | ...................... | 348/734 |

(Continued)

*Primary Examiner* — Brian Yenke
(74) *Attorney, Agent, or Firm* — Christopher P. Maiorana, PC (57) ABSTRACT

An apparatus comprising a switching circuit and a display. The switching circuit may be configured to present an output signal in response to a plurality of input signals. The output signal may be generated in response to an active one of the input signals. A user prompt may appear prior to switching to the active one of the input signals. The user prompt may allow a user to confirm or reject switching to the active input. The display circuit may be configured to display information from the output signal.

18 Claims, 8 Drawing Sheets

(56) References Cited

U.S. PATENT DOCUMENTS

| | | | |
|---|---|---|---|
| 2003/0011467 A1* | 1/2003 | Suomela | 340/7.1 |
| 2004/0239816 A1* | 12/2004 | Ando | 348/705 |
| 2005/0060660 A1* | 3/2005 | Song | 715/781 |
| 2006/0164561 A1* | 7/2006 | Lacy et al. | 348/706 |
| 2006/0259646 A1* | 11/2006 | Lee et al. | 710/3 |
| 2008/0007659 A1 | 1/2008 | Yoshida et al. | 348/734 |
| 2009/0269038 A1* | 10/2009 | Takakuwa et al. | 386/108 |
| 2010/0048133 A1 | 2/2010 | Wang et al. | 455/41.3 |
| 2010/0073560 A1* | 3/2010 | Kitano et al. | 348/554 |
| 2010/0090849 A1* | 4/2010 | Suga | 340/653 |
| 2010/0188585 A1 | 7/2010 | Ichieda | 348/708 |
| 2012/0173957 A1* | 7/2012 | Humpleman et al. | 715/205 |

* cited by examiner

DIGITAL TELEVISION WITH IMPROVED INPUT SELECTION FUNCTIONALITY

FIELD OF THE INVENTION

The present invention relates to digital televisions generally and, more particularly, to a method and/or apparatus for implementing a digital television with improved input selection functionality.

BACKGROUND OF THE INVENTION

Conventional digital televisions (DTVs) have the ability to connect and view multiple source inputs (i.e., Cable TV, Sat TV, DVD/Blu-ray Player, VCR, etc.). The input connections on a DTV typically include Ant/Cable, Component Video 1, Component Video 2, RGB, HMDI 1, HDMI 2, USB, Composite, etc. As long as the source device has a matching connection (i.e., an HDMI output of a Satellite TV box is connected to an HDMI input of the DTV), a user is free to choose which source device is connected to which input connection on the DTV. When the user wants to watch a DVD instead of the cable TV, the user first selects the input menu on the DTV using the remote, then scrolls to the input of interest and then manually selects the input with the remote. Once an input is manually selected by the user, the internal electronics of the DTV switch to the selected input so the content can be viewed by the user.

It would be desirable to implement a method and/or apparatus in a television to automatically recognize that a source device has begun providing a signal and then either (i) automatically switch to the input for that source device or (ii) prompt the user with a screen, asking the user to confirm or reject switching to the new input to view the content.

SUMMARY OF THE INVENTION

The present invention concerns an apparatus comprising a switching circuit and a display. The switching circuit may be configured to present an output signal in response to a plurality of input signals. The output signal may be generated in response to an active one of the input signals. A user prompt may appear prior to switching to the active one of the input signals. The user prompt may allow a user to confirm or reject switching to the active input. The display circuit may be configured to display information from the output signal.

The objects, features and advantages of the present invention include providing a device that may (i) provide an input selection circuit in a television, (ii) provide a user prompt prior to switching inputs, (iii) provide a user prompt in a non-viewing area of a picture and/or (iv) provide a user prompt if two inputs are active.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
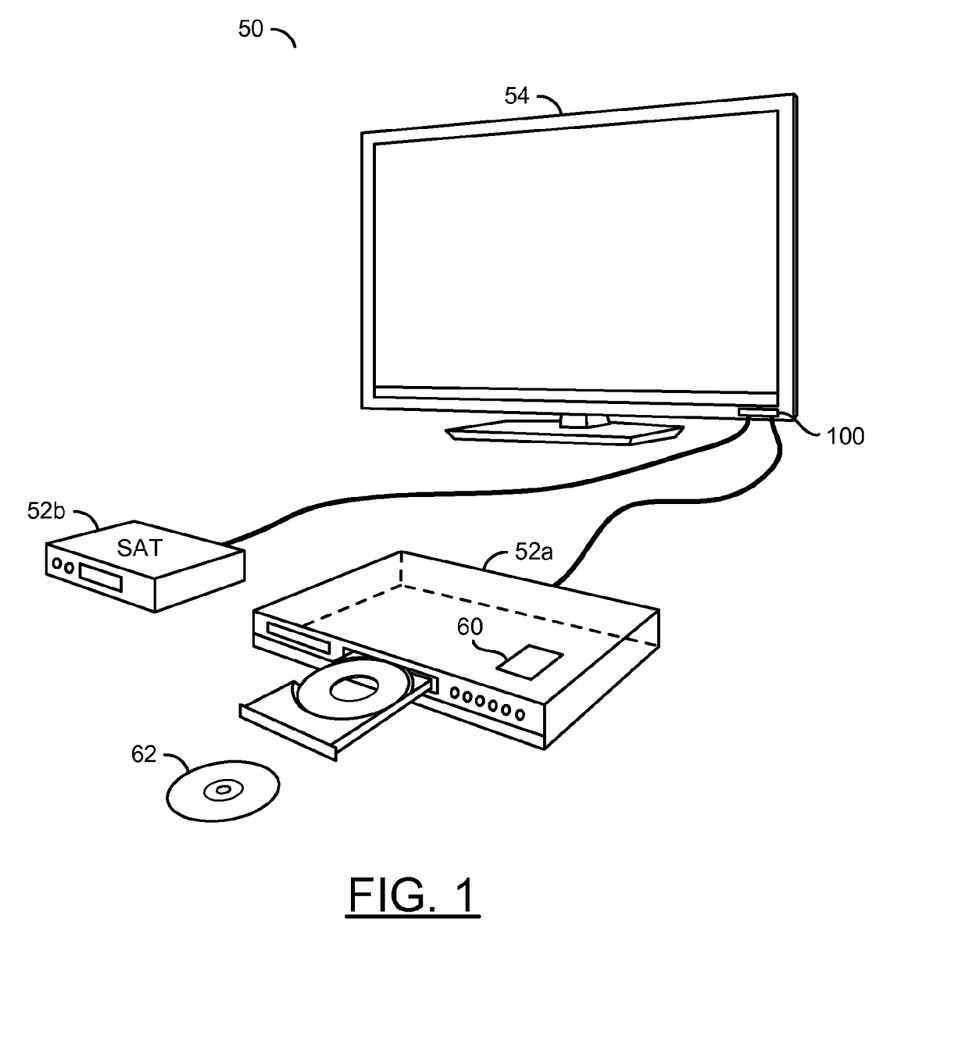
FIG. 1 is a diagram of an embodiment of the present invention.

Referring to FIG. 1, a block diagram of a system 50 is shown in accordance with an embodiment of the present invention. The system 50 generally comprises a number of blocks (or circuits) 52a-52b and a block (or circuit) 54. The circuits 52a-52n may be implemented as source devices, such as an optical disc player, a satellite receiver, etc. In one example, source device 54a may be implemented as an optical disc player, such as a DVD player. The source device 52a may also be implemented as a Blu-ray player. The block 54 may be implemented as a display device, such as a digital television (DTV), a plasma screen, LCD screen, or other appropriate display device. The source device 52a may include a block (or circuit) 60. The circuit 60 may be a memory and/or processor configured to store computer readable code that, when executed, performs various steps. A disc 62 may be inserted into the player. The disc 62 may be implemented as a removable optical disc. The block 54 may include a block (or circuit) 100. The circuit 100 may be implemented as a switching circuit.

Figure 2:
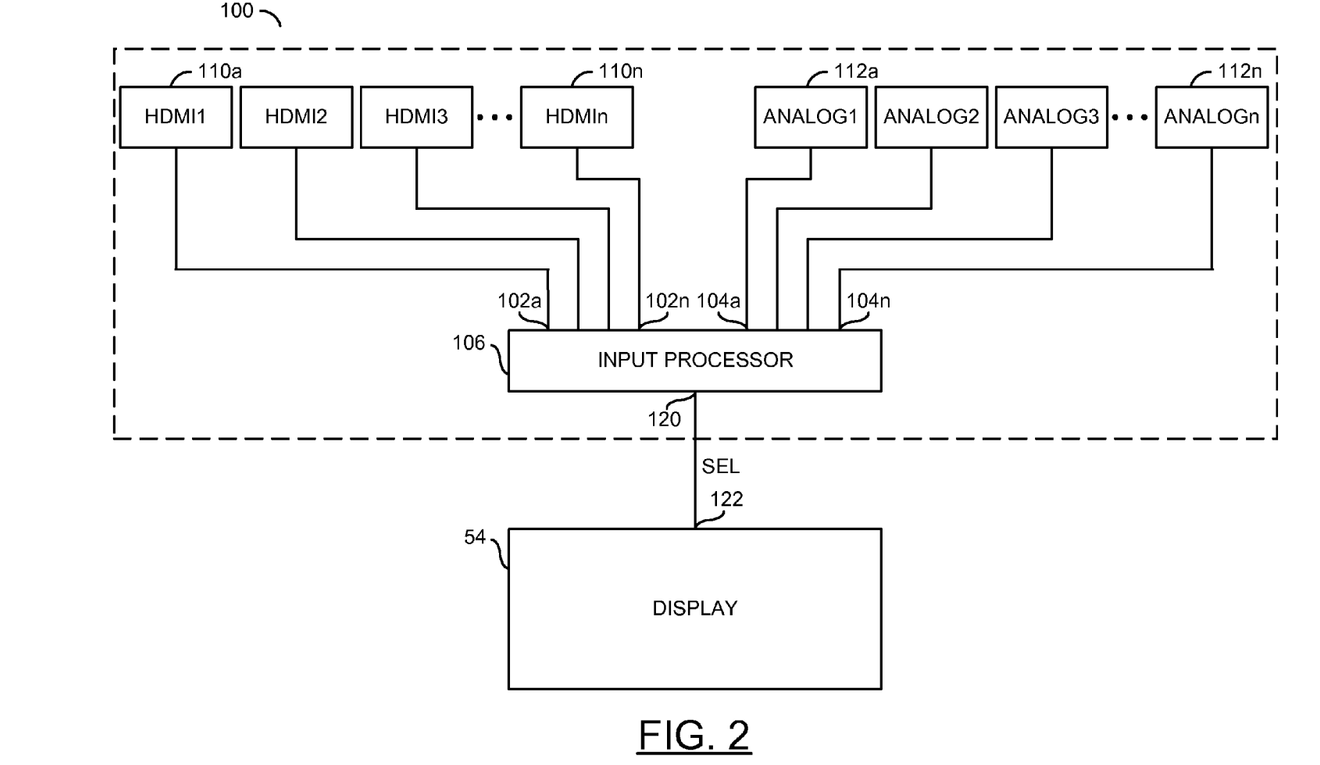
FIG. 2 is a block diagram of an embodiment of the present invention.

Referring to FIG. 2, a block diagram of the circuit 100 is shown in accordance with an embodiment of the present invention. In one example, the circuit 100 may be implemented as part of a digital television. In another example, the circuit 100 may be implemented as an external device that may be connected to a digital television. In yet another example, the circuit 100 may be implemented as part of the video switching portion of an audio/video receiver that may be connected to a digital television.

The circuit 100 generally comprises a number of inputs 102a-102n, a number of inputs 104a-104n, a block (or circuit) 106 and a block (or circuit) 108. The inputs 102a-102n may be implemented as digital inputs. For example, the inputs 102a-102n may be implemented as HDMI inputs. In another example, the inputs 102a-102n may be implemented as Digital Video Interface (DVI) inputs. However, the particular type of digital input implemented may be varied to meet the design criteria of a particular implementation. The inputs 104a-104n may be implemented as analog inputs. For example, the inputs 104a-104n may be implemented as component video signals, composite video signals, S-video signals or other types of analog video signals. A number of devices 110a-110n may present a video signal to the inputs 102a-102n. Similarly, a number of devices 112a-112n may present a video signal to the inputs 104a-104n. The devices 110a-110n may be implemented, in one example, as digital devices, such as HDMI devices. The devices 112a-112n may be implemented, in one example, as analog devices.

The circuit 106 may have an output 120 that may present a signal (e.g., SEL) to an input 122 of the display 108. The signal SEL may be an output signal that may be presented to the display 108. The signal SEL may contain picture data, generally in uncompressed form, that may be displayed by the display device 54.

Figure 3:
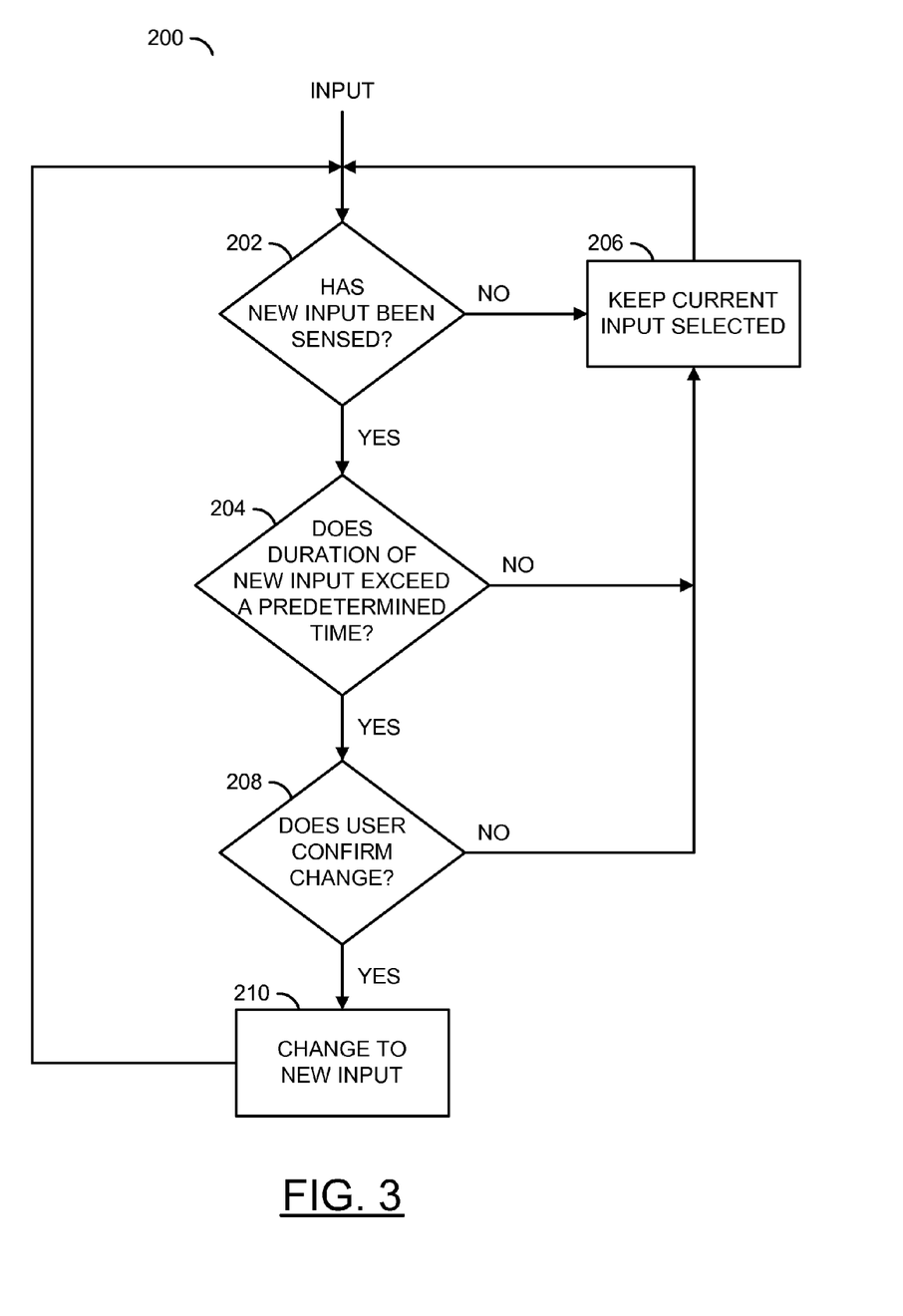
FIG. 3 is a flow diagram of an embodiment of the present invention.

Referring to FIG. 3, a flow diagram of a method (or process) 200 is shown. The process 200 generally comprises a decision step (or state) 202, a decision step (or state) 204, a step (or state) 206, a decision step (or state) 208, and a step (or state)

210. The decision step 202 may determine if a new input (e.g., one of the inputs 102a-102n or 104a-140n) has been sensed. If so, the method 200 moves to the state 204. If not, the method 200 moves to the state 206. The state 206 keeps the current input selected. The state 204 determines whether a duration of the new input exceeds a predetermined time. The predetermined time may be a fixed time, such as 20 ms. Such a predetermined time may allow the circuit 100 to avoid false switching that may occur during a transient state. The example of 20 ms may be varied to meet the design criteria of a particular implementation. So long as the predetermined time is long enough to ensure that false switching does not occur, the predetermined time may be lengthened or shortened. If the predetermined time is not exceeded, the method 200 moves to the state 206 which keeps the current input. If the predetermined time is exceeded, the method 200 moves to the state 208. The state 208 determines if a user confirms the change. If not, the method 200 moves to the state 206, which keeps the current input selected. If so, the method 200 moves to the state 210, which changes to the new input. The state 206 and the state 210 then move back to the state 202, which continues to determine if a new input has been sensed.

In an example operation, a user of the circuit 100 may be watching a first source device, such as a satellite TV signal. The satellite TV source may be implemented as the source device 112a. In such an example, the source device 112a may present a component signal (e.g., Y, Cb, Cr; Y, Pb, Pr; etc.) to the input 104a. The user may then want to switch inputs, perhaps to an optical disk player (e.g., such as a DVD/Blu-ray player). The optical device may be implemented, in one example, as the source device 110a. The source device 110a may present a digital signal to the input 102a. Once the source device 110a is turned on, the input 102a senses a new signal. Once the new signal on the input 102a exceeds the predetermined time, the user prompt from step 208 may ask the user whether the input should be changed. If the user is ready to watch the optical disk on the input 110a, the user would likely confirm the switching to the new input 102a. At this point, the signal SEL may pass through the signal received from the input 102a. However, if the user was turning on the source device 110a in an effort to let the source device 110a skip past the initial trailer information, while still watching the source device 112a, the user may choose to decline changing to the new input. By declining, the signal received at the input 104a would continue to be presented as a signal SEL. This would allow the source device 110a to complete a start up procedure (e.g., load firmware and/or become fully functional), and presumably reach the main menu screen, which sometimes takes in excess of one minute on an optical player enabled with complex JAVA script programming during boot-up.

Figure 4:
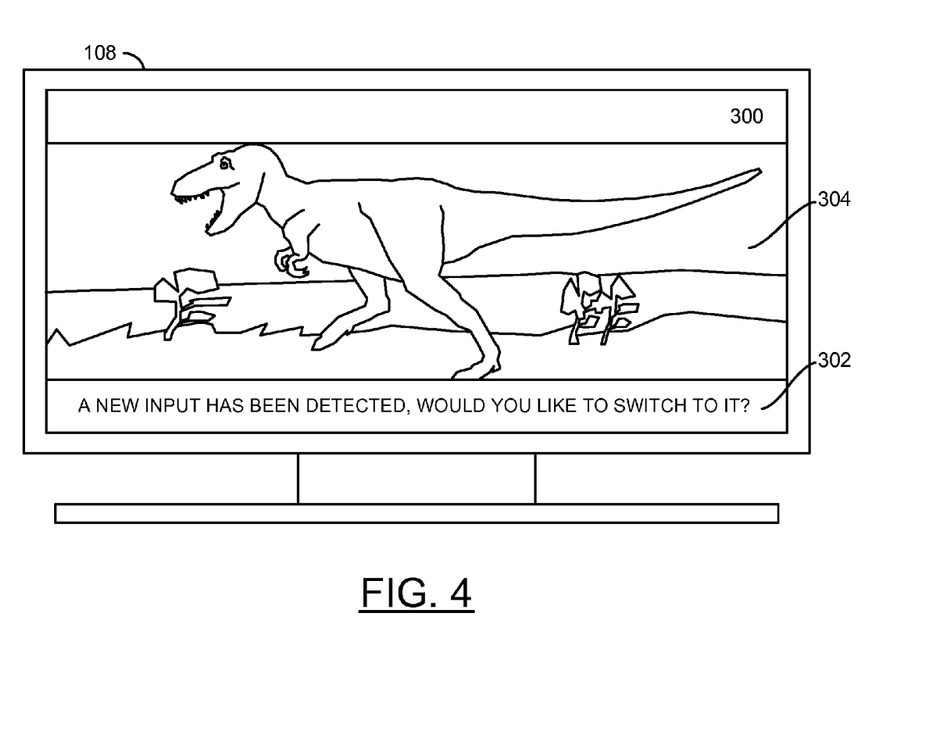
FIG. 4 is a diagram showing a placement of a user prompt.

Referring to FIG. 4, a diagram of a display 108 is shown. The display 108 has a black bar region 300, a black bar region 302 and a viewable region 304. The black bar regions 300 and 302 typically occur when the source region 304 is in one format (e.g., 1:1,235 or wide screen) and the display 108 is in another format (e.g., 16×9). The regions 300 and 302 may simply be blacked out. The user prompt, in this example asking "A new input has been detected, would you like to switch to the new input?" may be positioned in the region 302. By positioning the user prompt in the region 300 and/or 302, disruption of the playback region 304 is minimized.

Figure 5:
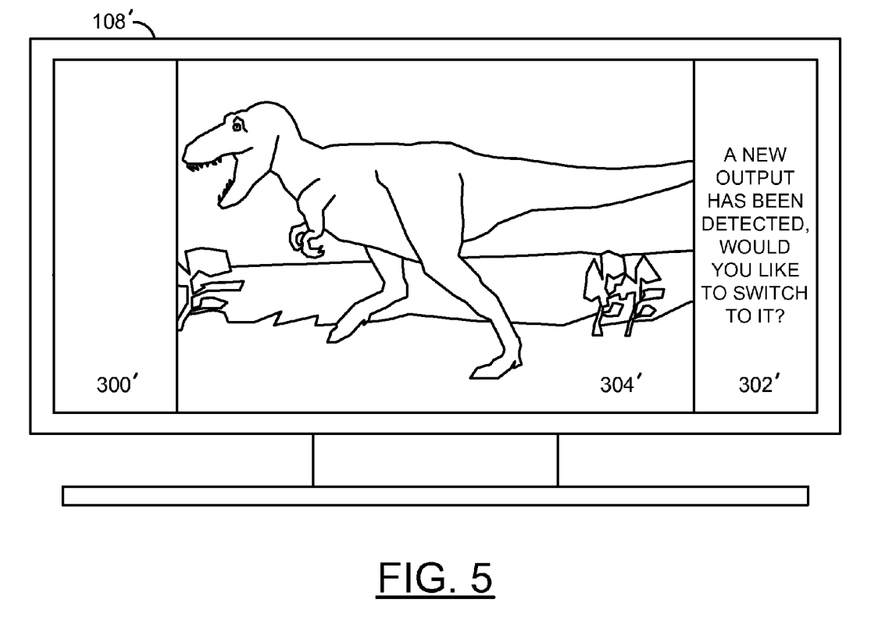
FIG. 5 is a diagram showing a placement of a user prompt.

Referring to FIG. 5, an alternate implementation of the monitor 108' is shown. The black bar regions 300' and/or 302' may be across the left and right sides respectively. The black bar regions 300' and/or 302' typically occur when the source region 304' is in one format (e.g., 4×3) and the display 108' is in another format (e.g., 16×9). The user prompt may be placed within the black bar region 302'. Similar to the monitor 100 described in connection with FIG. 3, the user prompt does not disrupt the viewable area 304'.

The circuit 100 may be implemented to receive an output signal from a set-top box 110a and/or Btu-ray player 110b. The particular type of input 102a-102n used by a particular source device 110a-110n may be varied to meet the design criteria of a particular implementation. In one example, the set-top box 52b may be powered on while the Blu-ray player 52a (or one of the source devices 52a-52n) is powered off. In such an example, the signal SEL may be set to watch the content from the set-top box 52b. The Blu-ray player 52a may then be powered on, either by a user or an internal timer within the player 52a. The output signal generated when the Blu-ray player 52a is powered on may be transmitted from the Blu-ray player through an HDMI output. In such an example, the input 110a may be connected to the DTV. The internal electronics of the circuit 100 and/or firmware may now be recognized and/or processed to generate the signal SEL.

In another example, the set-top box 52b may be powered on, while the device 52a is powered off. The DTV 54 may be set to watch the content being provided by the set-top box 52a. The new device 52a (e.g., a Blu-ray player) is then powered on, either by a user or an internal timer with the player. Based upon the output signal generated when the player 52a is powered on and/or transmitted from the Blu-ray player to the input connection on the DTV 54, the internal electronics and/or firmware of the circuit 100 may recognize and/or process the output signal from the Blu-ray player. The prompt 208 may provide a menu, asking if a user would like to switch the input to the new device 52a.

Figure 6:
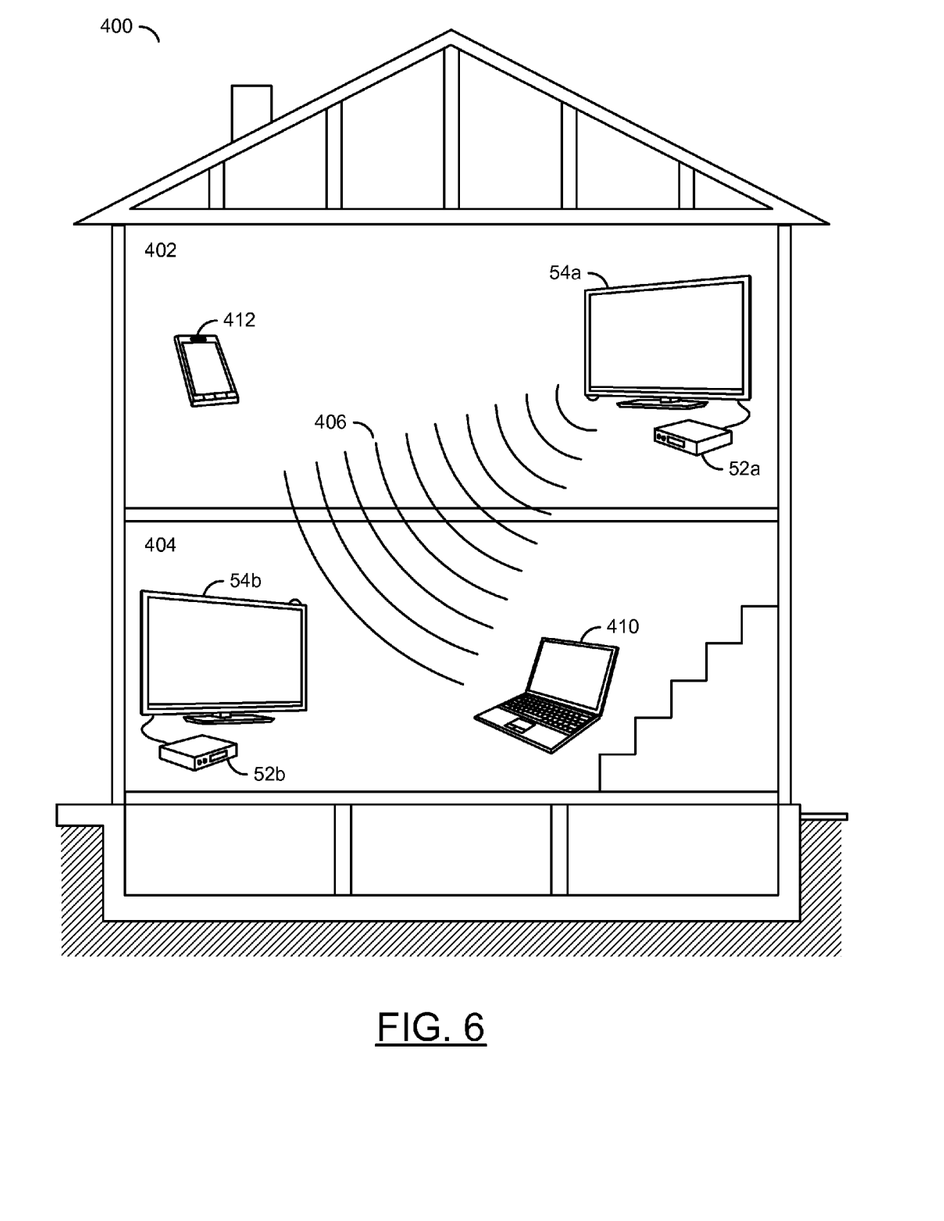
FIG. 6 is a diagram of a multi-room configuration of the present invention.

Referring to FIG. 6, an example of a multi-room environment 400 is shown. A television 54a and a source device 52a are shown in a first room 402. A television 54b and a source device 52b are shown in a second room 404. Alternately, the source device 52a and/or the source device 52b may be connected to the television 54a and/or the television 54b through a wireless signal 404 as shown. A wired home network (e.g., such as an Ethernet network through an RJ-45 type connection) may also be implemented. The wireless signal 406 may be implemented as a 802.11 wireless signal (e.g., wireless B, wireless G, wireless N, etc.), Bluetooth, and/or other type of wireless signal. In one example, a connection between the television 54a and the television 54b may be made via the wireless connection 406.

In one example, a disc may be loaded into the source device 52a. The television 54b may recognize that a new component 52a has been turned on. The television 54b may then prompt one or more viewers if they would like to switch to the new input to view content from the source device 52a. The viewers of the television 54b may then watch the same source material from the source device 52a that is being viewed by the television 54a. In one example, the data stream from the source device 52a may be directed to a digital video recorder (DVR) (e.g., situated near the television 54b). The viewers of the television 54b may then have the ability to pause the playback (or fast-forward, rewind, etc.), as if the viewers of the television 54b were in control of the playback of the source device 52a. In such a multi-room environment 400, all of the source components 52a-52n and/or televisions 54a-54n may be interconnected and/or accessible to each other.

Additionally, laptops and/or smart phones may be recognized and/or may interact with the televisions 52a-52b wirelessly, adding additional functionality and/or interplay between components. For example, a Blu-ray player in a notebook computer 410 may act as a source device for playback of a movie on one or more of the televisions 54a-54n. In another example, a smart phone may transmit images to one or more of the televisions 54a-54n. While a notebook computer 410 and a smartphone 412 have been described, the particular type and/or number of source devices may be varied to meet the design criteria of a particular implementation.

Figure 7:
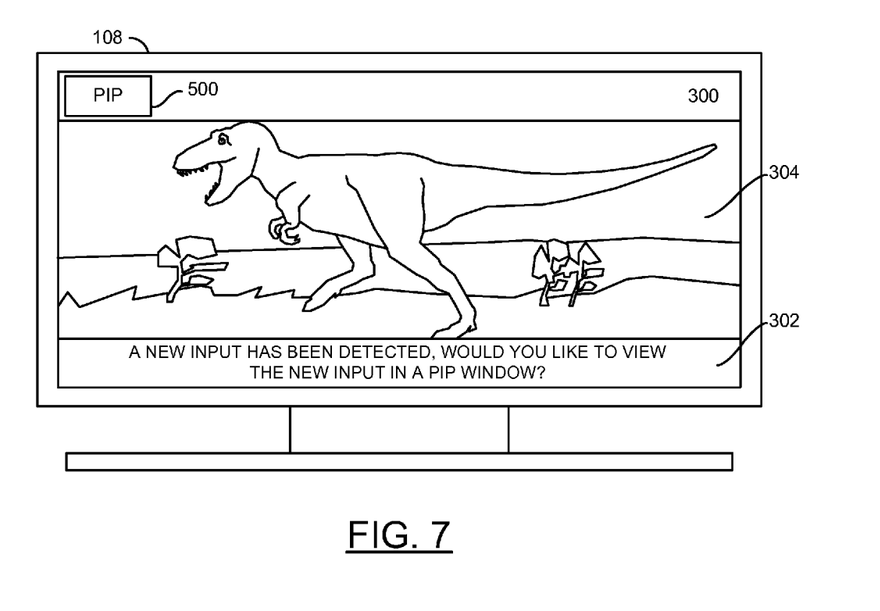
FIG. 7 is a diagram of an embodiment with a second input in a picture-in-picture window.

Referring to FIG. 7, a diagram of an embodiment with more than one screen prompt is shown. A picture-in-picture (PIP) window 500 may be used to aid the user. The PIP window 500 may be a portion of the display 108 configured to display a video signal that may be the same or different than the video signal displayed in the source region 304. After the initial screen prompt of, for example, "A new input has been detected, would you like to switch to the new input?" is shown, a second prompt may be used to further aid the user. For example, if the user indicates "no" to the first prompt, then the presentation continues. If the user indicates "yes", then a second screen prompt may ask "Would you like the new input to be displayed full screen or as PIP (picture in picture)?". If the user selects PIP, then the new input may be displayed in the PIP window 500, which may be located in one of the black bar regions 300 and/or 302. The user may continue viewing the first presentation as the primary screen, and then when the new content has fully loaded and is ready to view, the user may observe this in real time through the PIP window 500 and switch the new input to full screen. All of these steps may be fully interactive and may be made through additional prompts to the user (to be described in more detail in connection with FIG. 8).

Figure 8:
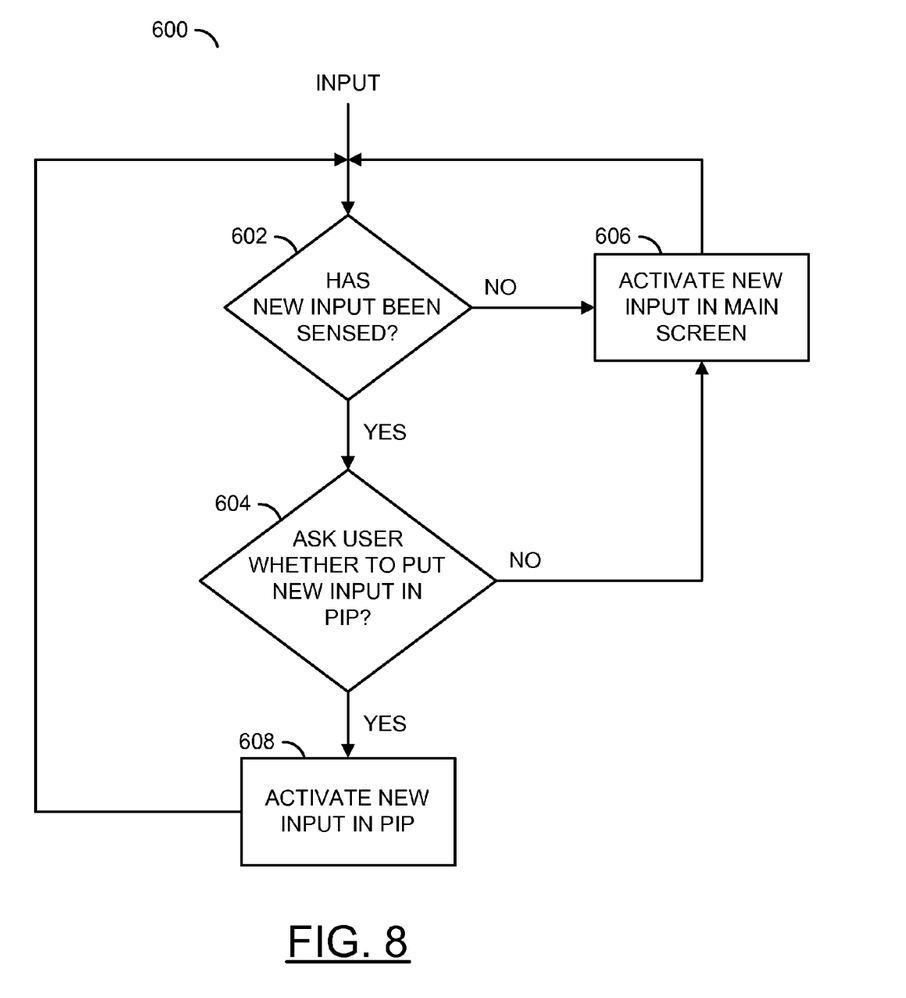
FIG. 8 is a flow diagram of another embodiment of the present invention.

Referring to FIG. 8, a flow diagram of an embodiment is shown. A flow diagram of a method (or process) 600 is shown. The process 600 generally comprises a decision step (or state) 602, a decision (or state) 604, a step (or state) 606 and a step (or state) 608. The decision step 602 may determine if a new input (e.g., one of the inputs 102a-102n or 104a-140n) has been sensed. If so, the method 600 moves to the state 604. If not, the method 600 moves to the state 606. The state 604 asks a user whether to view the new input in a PIP window 500. The state 606 activates the new input in the main screen area 304. If the user confirms the PIP display is needed, the method 600 moves to the state 608 which activates the new window in the PIP 500. If the user does not confirm the PIP display is needed, the method 600 moves to the state 608. The state 206 normally activates the new window in the main screen 304.

The functions performed by the diagrams of FIGS. 3 and 8 may be implemented using one or more of a conventional general purpose processor, digital computer, microprocessor, microcontroller, RISC (reduced instruction set computer) processor, CISC (complex instruction set computer) processor, SIND (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a switching circuit configured to present an output signal in response to a plurality of input signals, wherein (i) said output signal is generated in response to a currently active one of said input signals, (ii) a user prompt is generated within said output signal after a second one of said input signals is calculated to have been active for a predetermined time, (iii) said user prompt appears prior to switching to said second one of said input signals, (iv) said user prompt indicates that a user must either (a) confirm switching to said second one of said input signals or (b) reject switching to said second one of said input signals, (v) said user prompt (A) stays visible until said user selects or rejects said switching in a first mode and (B) disappears after a predetermined time if no user input has been received in a second mode, (vi) said user prompt appears on a portion of a screen at a location that does not obstruct viewing of said output signal, and (vii) said portion where said user prompt appears is in a black bar region of said output signal, wherein said black bar region is (a) across a top and a bottom side of said screen when said output signal is in a first format and (b) across a left and a right side of said screen when said output signal is in a second format;

a first display circuit configured to display information from said output signal, wherein said first display circuit continues to allow a device that generates said second one of said inputs to load a start up configuration while said currently active one of said input signals is viewable; and a second display circuit configured to receive said user prompt, wherein a user of said second display circuit is able to independently (a) confirm switching to said second one of said input signals or (b) reject switching to said second one of said input signals and said user prompt (A) stays visible until said user selects or rejects said switching in a first mode and (B) disappears after a predetermined time if no user input has been received in a second mode.

2. The apparatus according to claim 1, wherein said plurality of input signals comprise (i) one or more digital input signals and (ii) one or more analog input signals.

3. The apparatus according to claim 1, wherein said user prompt is generated automatically in response to said second one of said input signals being active for said predetermined time.

4. The apparatus according to claim 1, wherein said user prompt forces said user to switch between one of two active inputs.

5. The apparatus according to claim 4, wherein said user prompt appears when a first one of said input signals is active, and said second one of said input signals becomes active for said predetermined time.

6. The apparatus according to claim 1, wherein said apparatus provides a second user prompt asking said user which of said active input signals should be displayed in a secondary window.

7. The apparatus according to claim 6, wherein said secondary window comprises a picture-in-picture.

8. The apparatus according to claim 1, wherein said device that generates said second one of said input signals is allowed to continue a boot process after (i) said user rejects switching to said second one of said input signals or (ii) said user prompt disappears.

9. The apparatus according to claim 8, wherein said device that generates said second one of said input signals comprises a Btu-ray player.

10. The apparatus according to claim 8, wherein (A) said device that generates said second one of said input signals comprises a Blu-ray player and (B) said boot process comprises loading JAVA script programming.

11. The apparatus according to claim 1, wherein said second display is configured to buffer said second one of said input signals through a digital video recorder (DVR) to enable said user of said second display to pause playback of said second one of said input signals, wherein said pause is selected independently of said display information on said first display.

12. The apparatus according to claim 11, wherein said digital video recorder receives said currently active signal and second one of said input signals through a wireless connection.

13. An apparatus comprising:

means for generating an output signal in response to a plurality of input signals, wherein (i) said output signal is generated in response to a currently active one of said input signals, (ii) a user prompt is generated within said output signal after a second one of said input signals is calculated to have been active for a predetermined time, (iii) said user prompt appears prior to switching to said second one of said input signals, (iv) said user prompt indicates that a user must either (a) confirm switching to said second one of said input signals or (b) reject switching to said second one of said input signals, (v) said user prompt (A) stays visible until said user selects or rejects said switching in a first mode and (B) disappears after a predetermined time if no user input has been received in a second mode, (vi) said user prompt appears on a portion of a screen at a location that does not obstruct viewing of said output signal, and (vii) said portion where said user prompt appears is in a black bar region of said output signal, wherein said black bar region is (a) across a top and a bottom side of said screen when said output signal is in a first format and (b) across a left and a right side of said screen when said output signal is in a second format;

means for displaying information from said output signal, wherein said means for displaying information from said output signal continues to allow a device that generates said second of said inputs to load a start up configuration while said currently active one of said input signals is viewable; and means for receiving and displaying said user prompt, wherein a user of said means for receiving and displaying said user prompt is able to independently (a) confirm switching to said second one of said input signals or (b) reject switching to said second one of said input signals and said user prompt (A) stays visible until said user selects or rejects said switching in a first mode and (B) disappears after a predetermined time if no user input has been received in a second mode.

14. A method for controlling a signal in a television, comprising the steps of:

(A) generating an output signal in response to a plurality of input signals, wherein (i) said output signal is generated in response to a currently active one of said input signals, (ii) a user prompt is generated within said output signal after a second one of said input signals is calculated to have been active for a predetermined time, (iii) said user prompt appears prior to switching to said second one of said input signals, (iv) said user prompt indicates that a user must either (a) confirm switching to said second one of said input signals or (b) reject switching to said second one of said input signals, (v) said user prompt (A) stays visible until said user selects or rejects said switching in a first mode and (B) disappears after a predetermined time if no user input has been received in a second mode, (vi) said user prompt appears on a portion of a screen at a location that does not obstruct viewing of said output signal, and (vii) said portion where said user prompt appears is in a black bar region of said output signal, wherein said black bar region is (a) across a top and a bottom side of said screen when said output signal is in a first format and (b) across a left and a right side of said screen when said output signal is in a second format;

(B) displaying information from said output signal by continuing to allow a device that generates said second of said inputs to load a start up configuration while said currently active one of said input signals is viewable; and (C) receiving and displaying said user prompt, wherein a user is able to independently (a) confirm switching to said second one of said input signals or (b) reject switching to said second one of said input signals and said user prompt (A) stays visible until said user selects or rejects said switching in a first mode and (B) disappears after a predetermined time if no user input has been received in a second mode.

15. The method according to claim 14, further comprising the step of:

prior to step (A), waiting a predetermined time.

16. The method according to claim 14, wherein said method provides a second user prompt asking said user which of said active input signals should be displayed in a secondary window.

17. The method according to claim 16, wherein said secondary window comprises a picture-in-picture.

18. The method according to claim 14, wherein said device for generating said second one of said input signals is allowed to continue a boot process after (i) said user rejects switching to said second one of said input signals or (ii) said user prompt disappears.

* * * * *